United States Patent [19]
Kullmann et al.

[11] Patent Number: 5,593,005
[45] Date of Patent: Jan. 14, 1997

[54] CALIPER-TYPE DISC BRAKE WITH STEPPED ROTOR

[75] Inventors: Bernhard Kullmann, Rochester Hills; Joerg Scheibel, Auburn Hills, both of Mich.; Larry Masserant, Frankfurt, Germany; Daniel Keck, Westland; Werner Gottschalk, Auburn Hills, both of Mich.

[73] Assignee: ITT Automotive, Inc., Auburn Hills, Mich.

[21] Appl. No.: 486,457

[22] Filed: Jun. 7, 1995

[51] Int. Cl.$^6$ .............................. F16D 55/22; F16D 65/12
[52] U.S. Cl. ........................................ 188/72.4; 188/73.1
[58] Field of Search .................................. 188/71.1, 72.2, 188/72.4, 73.1, 18 A, 218 L, 365–370; 192/65, 85 AA, 66, 70.15

[56] References Cited

U.S. PATENT DOCUMENTS

| | | |
|---|---|---|
| 3,186,517 | 6/1965 | Harrison . |
| 3,273,675 | 9/1966 | Brown . |
| 3,312,316 | 4/1967 | Burnett ................................... 188/71.8 |
| 3,378,114 | 4/1968 | Hollins . |
| 3,517,777 | 6/1970 | Beller ..................................... 188/73.1 |
| 3,983,969 | 10/1976 | Colpaert et al. . |
| 3,993,173 | 11/1976 | Hoffman . |
| 4,289,216 | 9/1981 | Shirai et al. ........................... 188/72.2 |
| 4,374,553 | 2/1983 | Peck et al. . |
| 4,448,291 | 5/1984 | Ritsema et al. . |
| 4,460,070 | 7/1984 | Meyer et al. ........................... 188/73.1 |
| 4,533,025 | 8/1985 | Carré ..................................... 188/73.1 |
| 4,712,654 | 12/1987 | Temple et al. ......................... 188/71.8 |
| 4,811,822 | 3/1989 | Estaque . |
| 4,930,606 | 6/1990 | Sporzynski et al. . |
| 5,010,985 | 4/1991 | Russell et al. . |
| 5,022,500 | 6/1991 | Wang . |
| 5,249,649 | 10/1993 | Emmons ................................. 188/370 |

FOREIGN PATENT DOCUMENTS

| | | | |
|---|---|---|---|
| 1336878 | of 1962 | France ................................... 188/72.4 |
| 0329831 | 8/1989 | Germany ............................... 188/73.1 |
| 199785 | 3/1966 | U.S.S.R. . |
| 0199785 | 7/1967 | U.S.S.R. . |
| 1019094 | 2/1966 | United Kingdom . |
| 1108916 | 10/1968 | United Kingdom . |

*Primary Examiner*—Robert J. Oberleitner
*Assistant Examiner*—Chris Schwartz
*Attorney, Agent, or Firm*—Thomas N. Twomey; J. Gordon Lewis

[57] ABSTRACT

A disc brake for the wheel of a motor vehicle includes a rotor mounted to the wheel, and a caliper straddling the rotor and supporting a brake pad on either side thereof. In order to accommodate packaging constraints within the wheel's rim, the outboard pad and the rotor's outboard friction surface are both positioned radially inwardly of the inboard pad and inboard rotor friction surface. A hydraulic piston located in the inboard portion of the caliper first urges the inboard pad along the piston's longitudinal axis into initial engagement with the rotor's inboard friction surface, whereupon the piston acts through the caliper's bridge and finger area to urge the outboard pad into engagement with the rotor's outboard friction surface. The effective radius of each pad is less than the radial offset of the piston's longitudinal axis from the rotational axis of the wheel and rotor so as to reduce the bending moment applied to the rotor upon braking.

5 Claims, 1 Drawing Sheet

CALIPER-TYPE DISC BRAKE WITH STEPPED ROTOR

TECHNICAL FIELD

The present invention relates to an improved caliper-type disc brake for applying a braking torque to a wheel of a motor vehicle. More specifically, the invention relates to caliper-type disc brakes which seek to maximize vehicle braking performance within the physical confines of the wheel's inner rim.

BACKGROUND OF THE INVENTION

The prior art teaches disc brakes for motor vehicles generally comprising a circular disc or rotor mounted to a wheel for rotation therewith about an axis. An anchor member, rigidly mounted to the axle which supports the wheel, also provides rigid support for a caliper which otherwise straddles a portion of the periphery of the rotor. Brake linings or "pads" supported by the caliper on either side of the disc are urged into engagement with frictional surfaces on the opposite faces of the rotor to generate braking torque, as by supplying pressurized hydraulic fluid to a piston housed within one or both ends of the caliper.

Typically, these prior art disc brakes utilize like-sized brake pads on either side of the rotor. Each brake pad is likewise provided with substantially the same effective radius, that is, the braking force generated by each brake pad upon being urged against its respective mating rotor surface is effectively offset the same radial distance from the rotational axis of the wheel/rotor assembly. The contact area of each brake pad is typically "aligned" with, i.e., is centered about, the longitudinal axis of the piston operating to urge that pad towards its mating rotor surface. The normal forces exerted by the brake pads on both rotor surfaces will thus likewise be axially aligned and, hence, application of an undesirable moment on the brake rotor will be avoided (the art has recognized that application of such moments are undesirable, for example, given the likelihood of uneven wear of the brake pads).

However, in at least one prior art design for a "fixed"-type caliper—that is, a nonswinging dual-opposed-piston caliper—the pad located on the side of the rotor nearest the hub of the wheel (hereinafter "the outboard pad") is deliberately positioned nearer the wheel's rotational axis than its counterpart on the other side of the rotor (hereinafter the "inboard pad"). This is an attempt to provide a maximum effective radius/swept area for each individual pad while otherwise accommodating those wheels whose inner rims provide less radial clearance for the outboard pad than for the inboard pad. In such a design, the outboard portions of the caliper, including its outboard piston's longitudinal axis, are likewise displaced radially inwardly, relative to the inboard portions of the caliper, towards the wheel's rotational axis. As might be expected, under this approach, each like-sized brake pad is maintained in alignment with the longitudinal axis of its respective piston.

Unfortunately, while affording greater radial clearance between the wheel rim and the periphery of the brake caliper—particularly along its outboard end—the radially inward displacement of the outboard pad and its driving piston correlatively reduces the pad's effective radius. Since the effective radius of the inboard pad remains unchanged, the resulting disparity between the effective radius of each pad, coupled with the lack of alignment between the longitudinal axes of the inboard and outboard pistons, results in application of a bending moment to the rotor and, correspondingly, uneven brake pad wear. This, in turn, results in a loss over time of vehicle braking performance, offsetting any potential gains which might otherwise have resulted from the increased swept area achieved by the radially-outer inboard pad.

What is needed, then, is an improved caliper-type disc brake for the wheel of a motor vehicle which maximizes use of available packaging space within the wheel's inner rim to boost vehicle braking performance while minimizing applied moments and, correlatively, the uneven wear likely to result therefrom.

SUMMARY OF THE INVENTION

Under the present invention, a disc brake for applying a net braking torque to a wheel of a motor vehicle which rotates about a first axis comprises a rotor mounted to the wheel, with the rotor having a first, inboard side and a second, outboard side defining an inboard annular friction surface and an outboard annular frictional surface, respectively. The outer peripheral edge of the rotor's outboard friction surface is also radially inward of the outer peripheral edge of the rotor's inboard friction surface, thereby maximizing the potential swept area on the rotor's inboard friction surface while accommodating the lesser radial clearance afforded by the wheel's inner rim on the rotor's outboard side.

The present disc brake also comprises a caliper straddling the rotor along a portion of its outer edge. The caliper supports a first, inboard brake pad in opposition with the rotor's inboard friction surface and a second, outboard brake pad in opposition with the rotor's outboard friction surface. Typically, due to the packaging constraints of current-production wheels, the radially-outermost edge of the outboard brake pad is radially inward of the radially-outermost edge of the inboard brake pad. The caliper also has a means, such as a hydraulically-operated piston, operating along a second axis substantially parallel to the rotational axis of the wheel and rotor, for urging the inboard and outboard brake pads into engagement with the inboard and outboard rotor friction surfaces, respectively.

Significantly, under the present invention, the effective radii of the first and second brake pads, when urged into engagement with their respective opposed rotor friction surfaces, are each less than the radial offset of the second axis from the first axis. By requiring that the effective radius of each brake pad—and, particularly, the inboard pad upon which the piston directly operates—be less than the radial distance between the wheel's rotational axis and the operational axis of the piston, the bending moment applied to the rotor upon braking will be markedly reduced as compared to the prior art dual-opposed-piston caliper brake described above (with its outboard piston and pad deliberately positioned nearer the wheel's rotational axis than their inboard counterparts). Stated another way, under the present invention, it is desirable to radially outwardly distance the piston's centerline from the effective radius of the inboard pad upon which the piston directly operates.

Even more preferably, under the present invention, the inner peripheral edge of the rotor's inboard friction surface is extended radially inward toward the rotational axis of the wheel and rotor, such that the inner peripheral edge of the rotor's inboard friction surface is nearer the rotational axis than the inner peripheral edge of the rotor's outboard friction surface. In addition to providing increased swept area and increased heat-sink mass, the radially-inward extension of the rotor's inboard friction surface allows for additional radially-inward extension of the inboard brake pad, with a correlative reduction in the pad's effective radius.

In accordance with another feature of the present invention, the thickness, swept area and/or frictional coefficient of the material of the inboard and/or outboard pads are further specified so as to substantially equalize the braking torque generated by each pad. In this manner, the bending moment applied to the rotor by the caliper is further minimized.

DETAILED DESCRIPTION OF THE PREFERRED EMBODIMENT(S)

Figure 1:
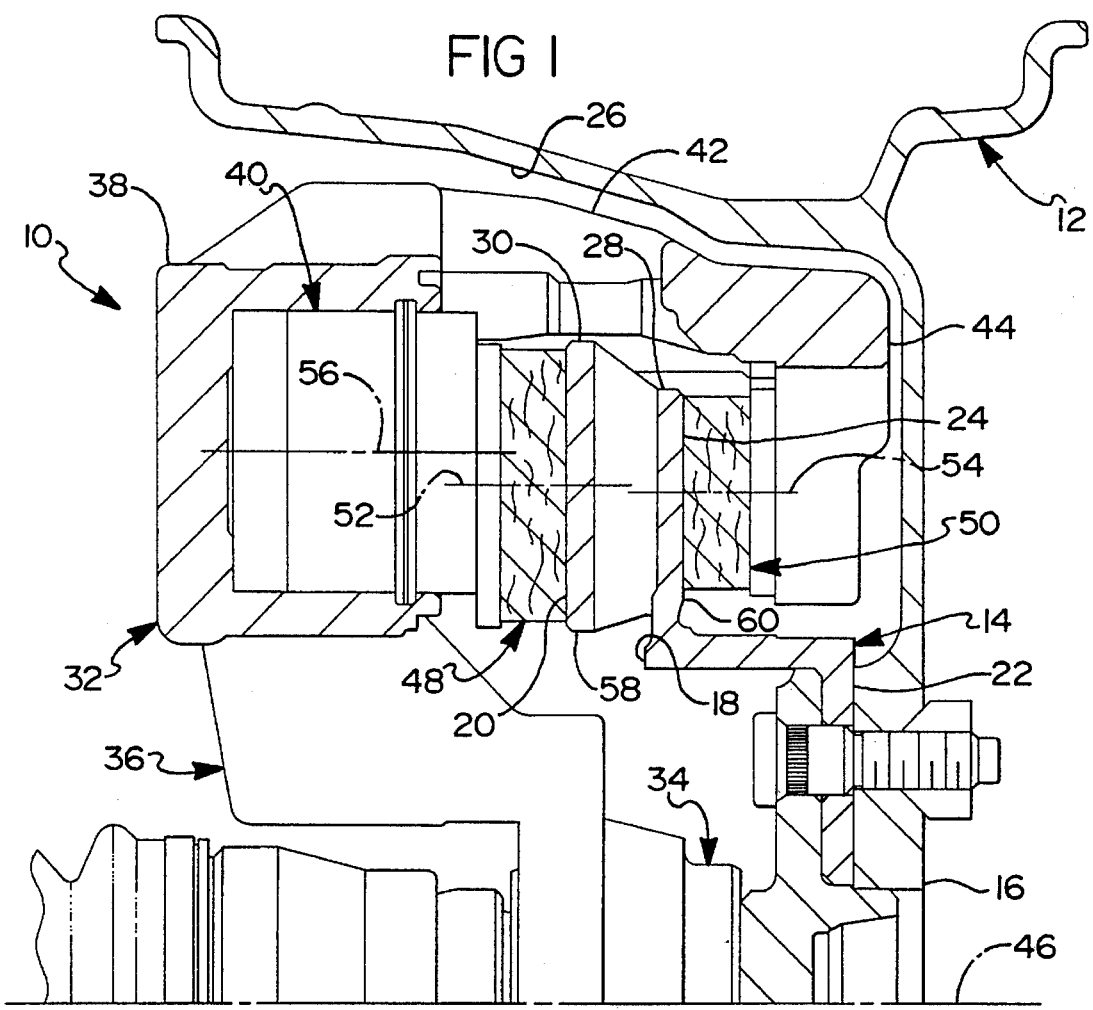
FIG. 1 is a fragmentary view of a cross-section of a caliper-type disc brake in accordance with the present invention.

Referring to FIG. 1, an exemplary "fist-type" caliper disc brake 10 for applying a braking torque to the wheel 12 of a motor vehicle includes a rotor 14 mounted to the wheel 12 at a point thereon proximate to its hub 16. The rotor 14 has a first, inboard side 18 defining an inboard annular friction surface 20, and a second, outboard side 22 defining an outboard annular frictional surface 24. Given the contour of the wheel's inner rim 26, the outer peripheral edge 28 of the rotor's outboard friction surface 24 is radially inward of the outer peripheral edge 30 of the rotor's inboard friction surface 20, thereby giving the rotor 14 a "stepped" outer profile in cross-section, as is readily seen in FIG. 1. The main advantage of the "stepped" outer profile is the maximization of potential swept area on the rotor's inboard friction surface 20 while accommodating the lesser radial clearance afforded by the wheel's inner rim 26 on the rotor's outboard side 22.

A caliper, indicated generally at 32, is slidably supported relative to the vehicle axle 34 by an anchor member 36, as through the use of pins (not shown) extending generally in a transverse direction relative to the rotational plane of the rotor 14. The caliper 32 itself includes a radially-inward, inboard portion 38 housing a hydraulic piston 40; a radially-outer bridge portion 42 which straddles the rotor 14 along a portion of its "stepped" outer edge; and a radially-inward finger area on its outboard portion 44. As seen in FIG. 1, the radially-outermost edges of the caliper's bridge 42 are contoured along much of its axial length to provide a fixed clearance between the bridge 42 and the wheel's inner rim 26. The finger area on the outboard portion 44 of the caliper 32 is thus positioned nearer to the rotational axis 46 of the wheel and rotor 14 than is the caliper's piston 40.

The caliper 32 itself supports a brake pad 48,50 on either side of the rotor 14 suitable for repeated engagement with the friction surfaces 20,24 disposed on the rotor's inboard and outboard sides 18,22, respectively. As was the case with the finger area on the outboard portion 44 of the caliper 32, the outboard pad 50 is positioned radially inward of the inboard pad 48 in response to the packaging constraints presented by the wheel's inner rim 26.

Each pad 48,50 is preferably individually sized and positioned relative to its mating rotor surface 20,24 so as to ensure that the effective radius 52,54 of each is less than the radial offset of the piston's centerline 56 from the rotor's rotational axis 46. Indeed, in accordance with the present invention, it is preferable to shift the centerline 56 along which the piston 40 exerts its effort as far radially-outwardly as is practical, given the packaging constraints within the wheel's inner rim 26, while correlatively extending the radially-inner edge of the inboard pad 48 radially-inwardly towards the rotational axis 46 of the rotor 14 to offset the increased bending moments otherwise generated upon such radially-outward displacement of the piston's centerline 56.

Thus, as seen in FIG. 1, the inner peripheral edge 58 of the rotor's inboard friction surface 20 is extended radially inward toward the rotor's rotational axis 46, such that the inner peripheral edge 58 of the rotor's inboard friction surface 20 is nearer the rotational axis 46 than the inner peripheral edge 60 of the rotor's outboard friction surface 24. The further radially-inward extension of the rotor's inboard friction surface 20 allows for additional radially-inward extension of the inboard brake pad 48, with an attendant increase in swept area, as well as a reduction in the pad's effective radius. A correlative benefit of extending the rotor's inboard friction surface 20 towards the rotational axis 46 is increased heat-sink mass.

In accordance with another feature of the present invention, inboard and outboard brake pad shapes, dimensions, thicknesses and/or frictional coefficients are further specified in a manner known to those of ordinary skill so as to substantially equalize the braking torque generated by each pad. In this manner, the bending moment applied to the rotor 14 upon operation of the caliper 32 is further minimized.

As with other "fist-type" caliper disc brakes, in operation, the piston 40 housed in the inboard portion 38 of the caliper 32 is operated under hydraulic pressure to first urge the inboard pad 48 along the piston's centerline 56 (generally substantially parallel to the rotational axis 46 of the wheel 12 and the rotor 14) and into engagement with the rotor's inboard friction surface 20. Once the inboard pad 48 has engaged the inboard friction surface 20 of the rotor 14, the piston's continuing effort will be in part exerted back upon the inboard portion 38 of the caliper 32. The caliper 32 will itself be urged to the left as shown in FIG. 1 and, in turn, will urge the outboard pad 50 into engagement with the rotor's outboard friction surface 24 by virtue of its bridge 42 and outboard portions 44.

Significantly, however, the effective radii 52,54 of the inboard and outboard pads 48,50 will be less than the radial offset of the piston's centerline 56 from the rotational axis 46 of the wheel 12 and the rotor 14. Most preferably, the effective radii 52,54 of the inboard and outboard pads 48,50 will be substantially equal, as illustrated in FIG. 1, thereby minimizing the bending moment applied to the rotor 14 upon braking. Moreover, in accordance with the present invention, the brake torque generated upon engagement of the inboard brake pad 48 with the rotor's inboard friction surface 20 is substantially equal to the brake torque generated upon engagement of the outboard brake pad 50 with the rotor's outboard friction surface 24. In this manner, the invention maximizes use of available packaging area within the wheel's inner rim 26 without triggering excessive pad wear.

Figure 2:
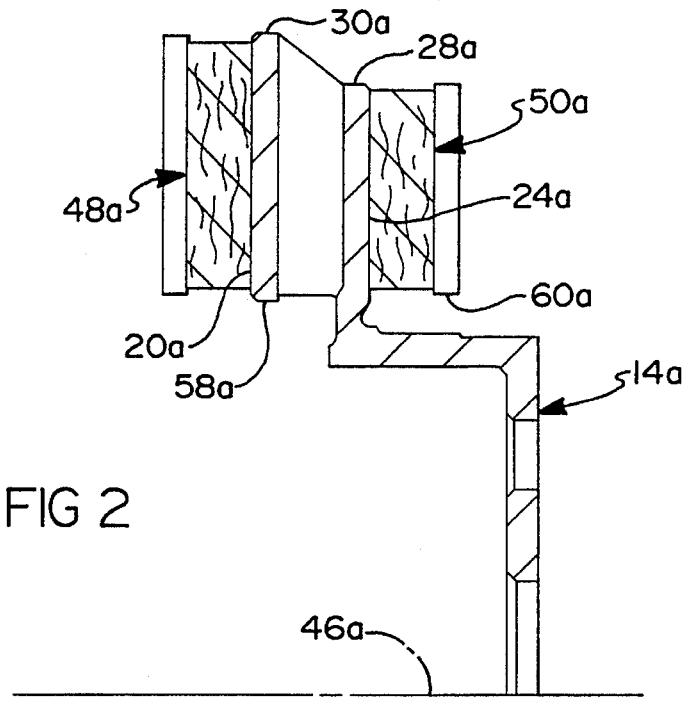
FIG. 2 is a fragmentary view in cross-section of an alternate embodiment of the brake rotor for use in the disc brake shown in FIG. 1.

FIG. 2 shows a fragmentary view in cross-section of an alternate embodiment of the brake rotor 14a for use in the disc brake otherwise shown in FIG. 1. More specifically, the alternate rotor 14a is provided with the same radially-stepped outer periphery as was the rotor 14 described above in connection with the preferred embodiment 10 shown in FIG. 1, with the outer peripheral edge 28a of its outboard friction surface 24a being radially inward of the outer peripheral edge 30a of its inboard friction surface 20a.

The relative positions of the inner peripheral edges 58a, 60a of the rotor's frictional surfaces 20a, 24a are, however, somewhat different in the alternate rotor 14a shown in FIG. 2. Specifically, the inner peripheral edge 58a of the inboard frictional surface 20a extends to substantially the same radial distance as the inner peripheral edge 60a of the outboard frictional surface 24a. The radially-innermost edge of the inboard brake pad 48a is likewise radially offset from the rotor's rotational axis 46a no farther than the radially-innermost edge of the outboard brake pad 50a. In this manner, the alternate rotor 14a and associated pads 48a,50a cooperate to reduce the bending moments applied to the rotor 14a during vehicle breaking, albeit to a lesser extent than does the preferred embodiment 10 shown in FIG. 1.

While the preferred embodiments of the invention have been disclosed, it should be appreciated that the invention is susceptible of modification without departing from the spirit of the invention or the scope of the subjoined claims.

We claim:

1. A disc brake for applying a net braking torque to a wheel of a motor vehicle, said wheel being rotatable about a first axis, said disc brake comprising:

a rotor mounted to said wheel, said rotor having a first side and a second side, wherein the first side defines a first annular friction surface and the second side defines a second annular frictional surface, and wherein the outer peripheral edge of the second friction surface is radially inward of the outer peripheral edge of the first friction surface; and a caliper straddling said rotor, said caliper supporting a first brake pad in opposition with a portion of the first friction surface on said rotor and a second brake pad in opposition with a portion of the second friction surface on said rotor, said caliper having a means, operative along a second axis substantially parallel with said first axis, for urging said first and second brake pads into engagement with the first and second friction surfaces of said rotor, respectively, wherein the radially-outermost edge of said second brake pad is radially inward of the radially-outermost edge of said first brake pad, and wherein the effective radii of said first brake pad and said second brake pad when urged into engagement with the first and second friction surfaces of said rotor, respectively, are each less than the radial offset of said second axis from said first axis.

2. The disc brake of claim 1, wherein the effective radius of said first brake pad is substantially equal to the effective radius of said second brake pad.

3. The disc brake of claim 1, wherein the inner peripheral edge of the first friction surface of said rotor is radially inward of the inner peripheral edge of the second friction surface of said rotor.

4. The disc brake of claim 1, wherein the radially-innermost edge of said first brake pad is radially offset from the first axis no farther than the radially-innermost edge of said second brake pad.

5. The disc brake of claim 1, wherein the brake torque generated upon engagement of said first brake pad with the first friction surface of said rotor is substantially equal to the brake torque generated upon engagement of said second brake pad with the second friction surface of said rotor.

\* \* \* \* \*